Figure 1:
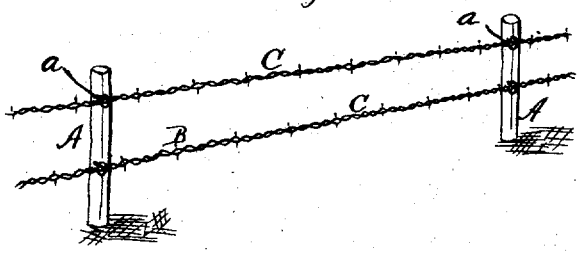
Figure 2:
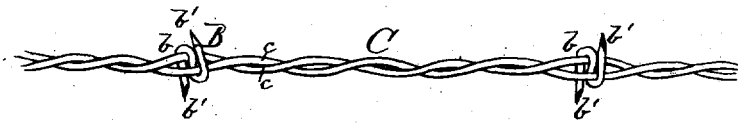

J. HAISH.

Barbed Fence-Wire.

No. 9,036. Reissued Jan. 6, 1880.

Witnesses:
L. B. Townsend
A. W. Munday

Inventor:
Jacob Haish
per: Munday & Evarts
Attorneys.

THE NORRIS PETERS CO., PHOTO-LITHO., WASHINGTON, D. C.

UNITED STATES PATENT OFFICE.

JACOB HAISH, OF DE KALB, ILLINOIS.

BARBED FENCE-WIRE.

SPECIFICATION forming part of Reissued Letters Patent No. 9,036, dated January 6, 1880.

Original No. 167,240, dated August 31, 1875. Application for Reissue filed October 7, 1879.

*To all whom it may concern:*

Be it known that I, JACOB HAISH, of De Kalb, in the county of De Kalb and State of Illinois, have invented a new and useful Improvement in Barbed Fence-Wire; and I do hereby declare the following to be a full, clear, and exact description thereof, which will enable others skilled in the art to which my invention appertains to make and use the same, reference being had to the accompanying drawing, forming a part of this specification.

My invention relates to a novel mode of constructing wire-fence barbs for application to the strands of twisted-wire fence-rails, either at the time of the manufacture of the twisted-wire fence-rail, or after the rail has been attached to the fence-post, so as to deter cattle and horses from throwing their weight against the rails when rubbing, or at other times, and thus breaking down the panels or causing them to sag.

A A represent two posts of a panel, placed at a suitable distance apart and provided with eyes *a* or other fastening device. C is a rail formed of two wires twisted together and sustained in the eyes *a a*. Of these there may be two or more.

B is my improved fence-barb, which consists of a single piece of wire bent at its center laterally, so that all its parts lie in the same plane in the form of the letter S, forming two loops, as shown, and having its ends *b′ b′* extended in opposite directions and sharpened at their points.

By the peculiar construction of said fence-barb B, on being applied to the fence rail each strand *c* of the rail passes through one of the loops of the body of the barb, and the barb passes around and between both strands of the rail, and the twist of the strands tends to bind firmly on the body *b* and hold the barb securely in place. The barb can be so attached to and at the time of twisting the wire rail, or it can be attached to both strands of the twisted-wire fence-rail, and so as to embrace each strand thereof, as shown, after the rail has been attached to the fence-posts, and without removing the rail from the posts, by being clamped therein and thereto by means of any suitable tool for that purpose.

The barb can be manufactured and sold for use as described, independently of the twisted fence-rail.

I claim—

1. A new article of manufacture, consisting of the double-pointed wire-fence barb made from a single piece of wire bent at its center laterally, so that all its parts lie in the same plane in the form of the letter S, forming two loops adapted to clasp both strands of the twisted wire, substantially as specified.

2. The combination, with the twisted two-strand fence-rail, of the wire barb, which passes around and between both strands of the rail, substantially as specified.

JACOB HAISH.

Witnesses:
E. M. CRANDAL,
EDWARD S. EVARTS.